US008688271B2

(12) United States Patent
Li et al.

(10) Patent No.: US 8,688,271 B2
(45) Date of Patent: Apr. 1, 2014

(54) GUIDING DEVICE FOR GUIDING MOBILE ROBOTIC VACUUM CLEANER TO CHARGING BASE

(75) Inventors: Gary Li, Guangdong (CN); Wen-Jang Lai, Taichung (TW)

(73) Assignee: Egenpower Inc., Laguna Niguel, CA (US)

( * ) Notice: Subject to any disclaimer, the term of this patent is extended or adjusted under 35 U.S.C. 154(b) by 426 days.

(21) Appl. No.: 13/004,690

(22) Filed: Jan. 11, 2011

(65) Prior Publication Data

US 2012/0089253 A1 Apr. 12, 2012

(30) Foreign Application Priority Data

Oct. 11, 2010 (CN) ...................... 2010 2 0574937 U

(51) Int. Cl.
*H02J 7/00* (2006.01)
(52) U.S. Cl.
USPC .......................................... 700/246; 398/106
(58) Field of Classification Search
USPC .................. 700/246, 245, 253, 258; 701/1–2, 701/22–25; 336/84 C; 324/96; 318/16–17, 318/480, 581; 398/106, 114
See application file for complete search history.

(56) References Cited

U.S. PATENT DOCUMENTS

| 7,430,462 | B2 | 9/2008 | Chiu et al. | |
|---|---|---|---|---|
| 2008/0065266 | A1* | 3/2008 | Kim | 700/245 |
| 2008/0174268 | A1* | 7/2008 | Koo et al. | 320/109 |
| 2012/0265346 | A1* | 10/2012 | Gilbert et al. | 700/259 |

* cited by examiner

*Primary Examiner* — Dalena Tran
(74) *Attorney, Agent, or Firm* — Muncy, Geissler, Olds & Lowe, P.C.

(57) ABSTRACT

A guiding device for guiding a mobile robotic vacuum cleaner to a charging base is composed of a central sensor, a left sensor, and a right sensor. The mobile robotic vacuum cleaner is composed of a main processor and a driving system. The charging base includes an optical emitter for emitting optical signals toward a predetermined direction. The central sensor, the right sensor, and the left sensor are electrically connected with the main processor and mounted to a charging sensor set zone. In this way, the main processor can judge whether the mobile robotic device correctly moves toward the charging base according to the signals detected by the sensors and then adjustably control the moving direction of the mobile robotic vacuum cleaner via the driving system to guide the mobile robotic vacuum cleaner to accurately move toward the charging base.

8 Claims, 5 Drawing Sheets

GUIDING DEVICE FOR GUIDING MOBILE ROBOTIC VACUUM CLEANER TO CHARGING BASE

BACKGROUND OF THE INVENTION

1. Field of the Invention

The present invention relates generally to a mobile robotic vacuum cleaner, and more particularly, to a guiding device for guiding a mobile robotic vacuum cleaner to a charging base.

2. Description of the Related Art

When a conventional mobile robotic vacuum cleaner needs to be charged, a user mostly needs to connect it to a transformer or a plug beforehand by himself or herself. Although such charging manner is simpler, it can only be done when the user is free to do so. However, the purpose of the mobile robotic vacuum cleaner is automatic operation without any manual operation. For this reason, the aforesaid conventional charging manner does not conform to the original purpose of the mobile robotic vacuum cleaner.

U.S. Pat. No. 7,430,462 disclosed a mobile robotic vacuum cleaner which allows itself to be automatically charged when it becomes low-power. When such mobile robotic vacuum cleaner needs to be charged, the charging base can emit infrared rays and the infrared sensor can detect the infrared rays to judge the position of the charging base and then the mobile robotic vacuum cleaner can move backward by backup or turning to the charging base for contact with the electrode of the charging base for charging. However, after the mobile robotic vacuum cleaner finds the charging base, the movement of the mobile robotic vacuum cleaner to the charging base is usually not accurate due to the frequent inaccuracy of the distance and angle, so the mobile robotic vacuum cleaner will fail to be charged correctly. Therefore, such conventional mobile robotic vacuum cleaner still needs improvement.

SUMMARY OF THE INVENTION

The primary objective of the present invention is to provide a guiding device, which can accurately guide a mobile robotic vacuum cleaner to a charging base.

The foregoing objective of the present invention is attained by the guiding device composed of a central sensor, a left sensor, and a right sensor. The mobile robotic vacuum cleaner is composed of a main processor and a driving system. The charging base includes an optical emitter for emitting optical signals toward a predetermined direction. A portion of the charging base that the mobile robotic vacuum cleaner faces when it moves to the charging base is defined as a charging sensor set zone. The central sensor, the right sensor, and the left sensor are electrically connected with the main processor and mounted to the charging sensor set zone. What these sensors detect are the optical signals emitted by the optical emitter. In this way, the main processor can judge whether the mobile robotic device correctly moves toward the charging base according to the signals detected by the sensors and then adjustably control the moving direction of the mobile robotic vacuum cleaner via the driving system to guide the mobile robotic vacuum cleaner to accurately move toward the charging base.

DETAILED DESCRIPTION OF PREFERRED EMBODIMENTS

Figure 1:
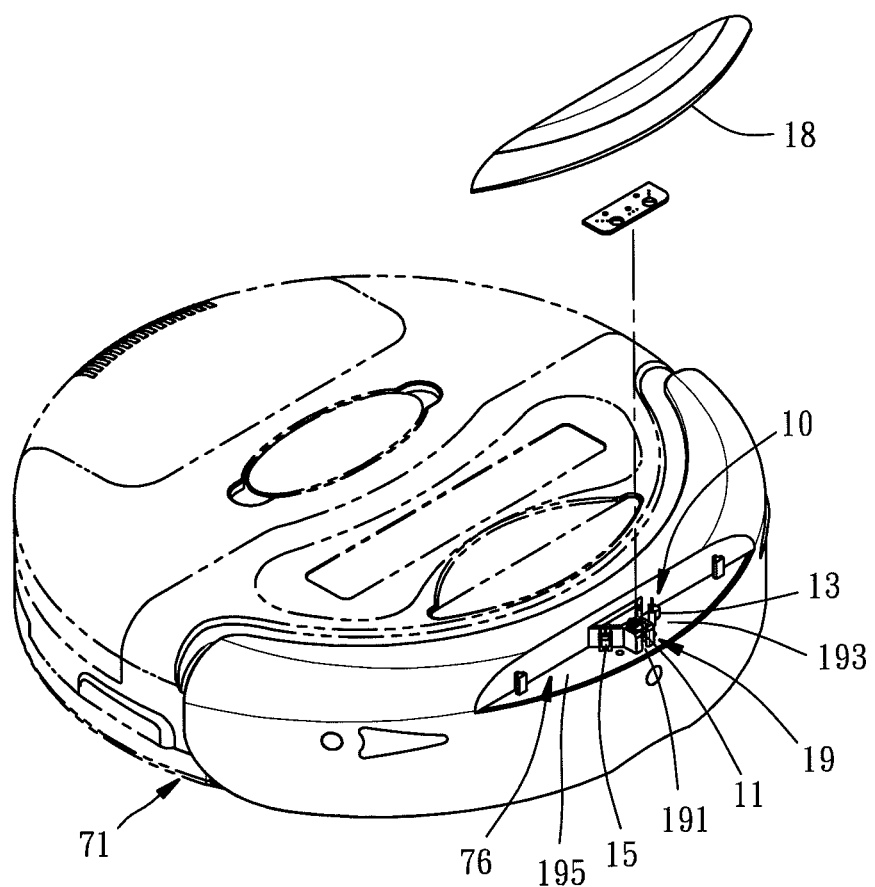
FIG. 1 is a partially exploded view of a preferred embodiment of the present invention.
Figure 2:
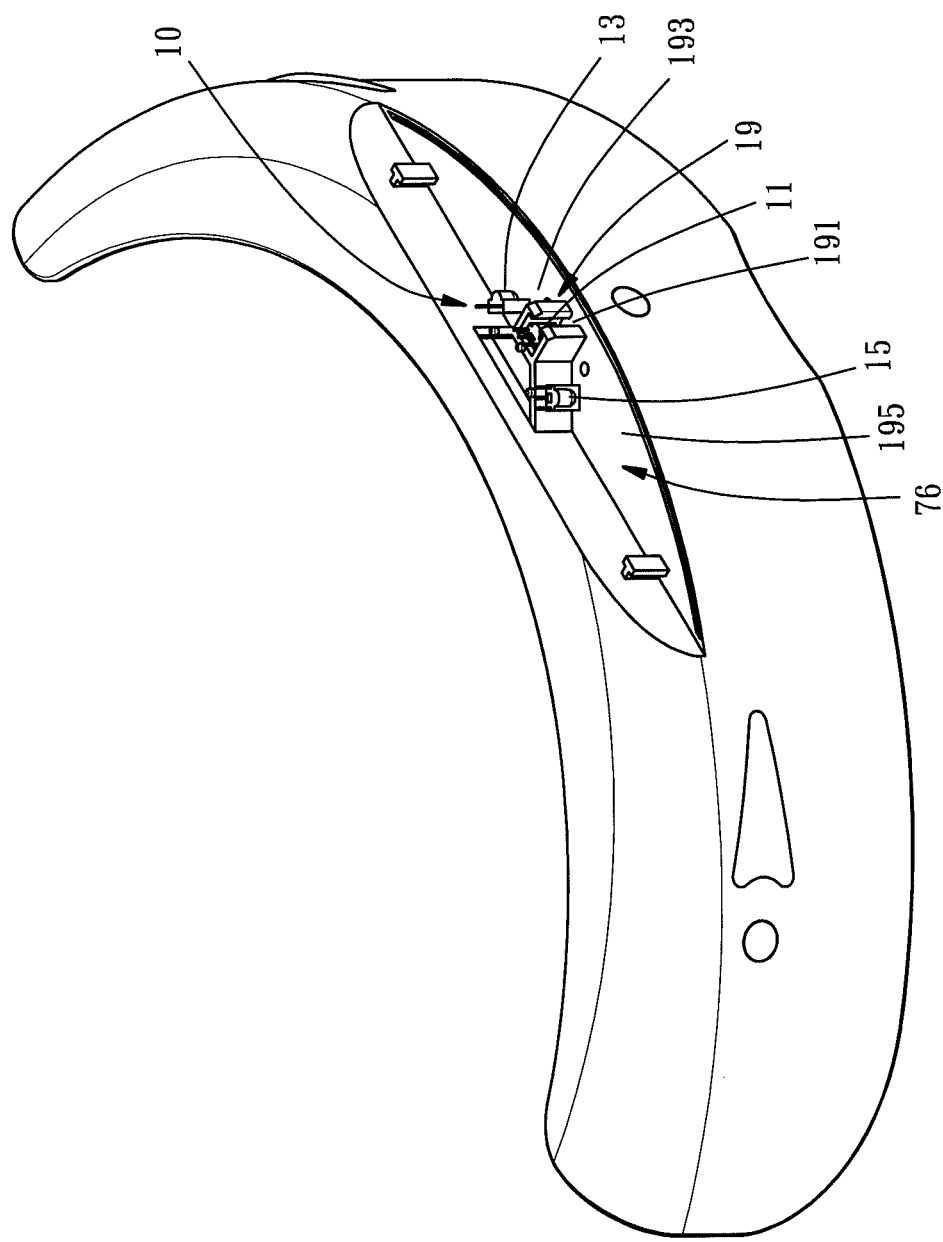
FIG. 2 is an enlarged view of a part of the preferred embodiment of the present invention, showing the combination of the sensors and the partition board set.
Figure 3:
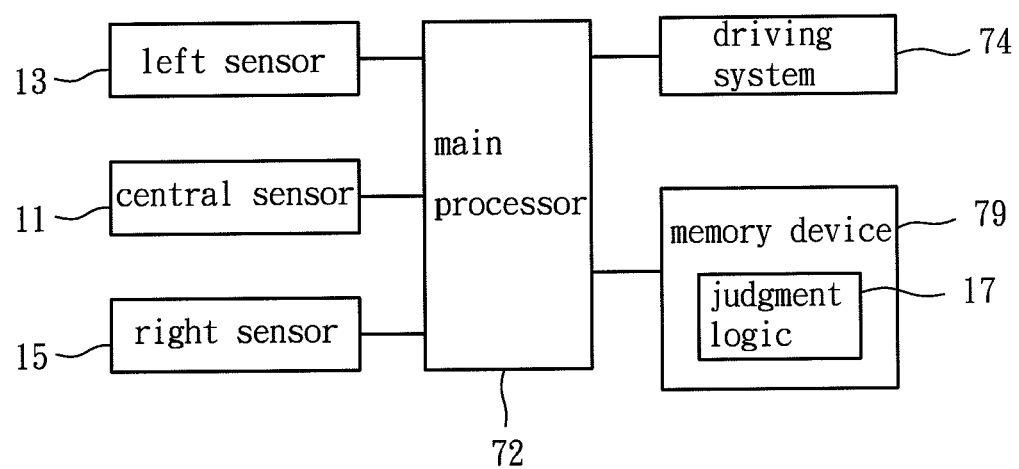
FIG. 3 is a block diagram of the preferred embodiment of the present invention.
Figure 4:
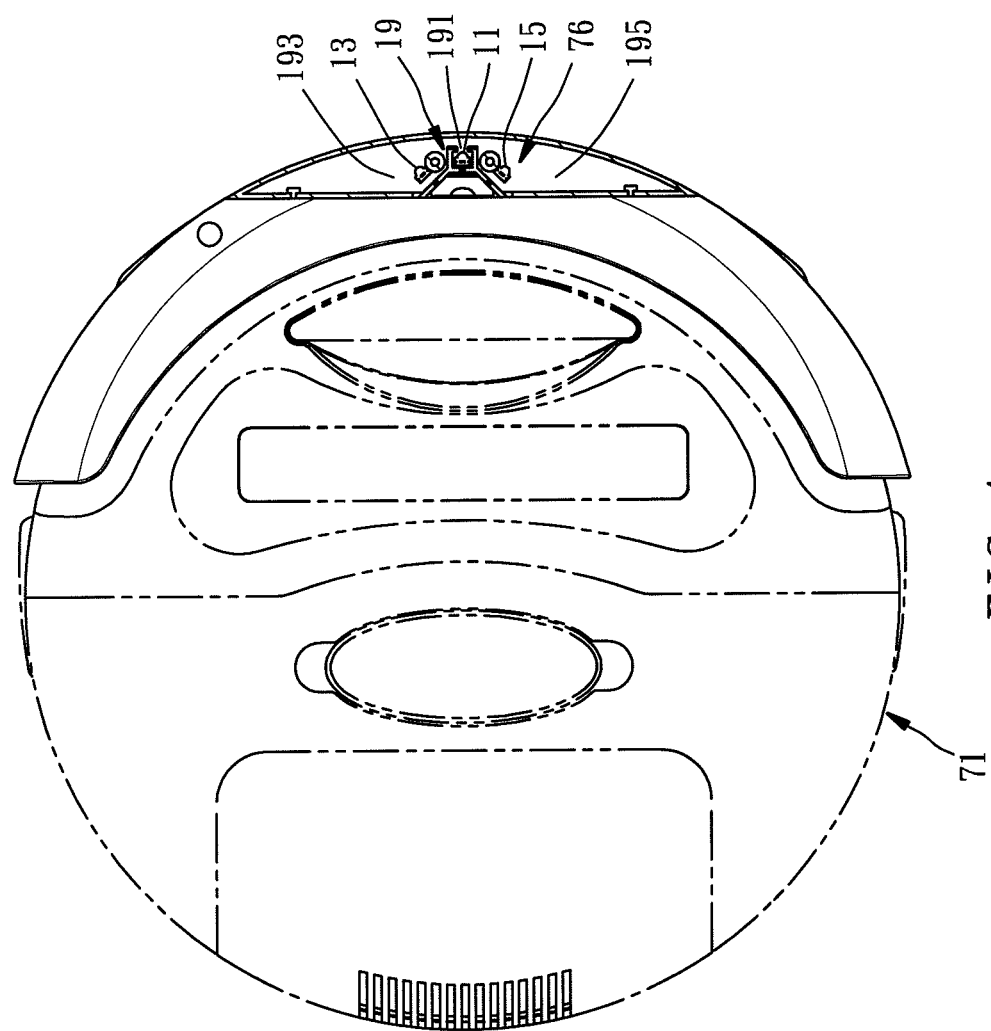
FIG. 4 is a top view of the preferred embodiment of the present invention, showing that the protective cover is removed therefrom.

Referring to FIGS. 1-4, a guiding device 10 for guiding a mobile robotic vacuum cleaner 71 to a charging base 81 in accordance with a preferred embodiment of the present invention is composed of a central sensor 11, a left sensor 13, and a right sensor 15. The mobile robotic vacuum cleaner 71 is composed of a main processor 72 and a driving system 74. The charging base 81 includes an optical emitter 82 for emitting optical signals toward a predetermined direction. The detailed descriptions and operations of these elements as well as their interrelations are recited in the respective paragraphs as follows.

The main processor 72 and the driving system 74 belong to the prior art and so do the charging base 81 and the optical emitter, so their structures and operations will not be recited any more. The optical signals emitted by the optical emitter 82 of the charging base 81 is infrared in this embodiment and can alternatively be ultraviolet or other invisible light.

A portion of the charging base 81 that the mobile robotic vacuum cleaner 71 faces when it moves to the charging base 81 is defined as a charging sensor set zone 76. In this embodiment, when it is intended to charge the mobile robotic vacuum cleaner 71, the mobile robotic vacuum cleaner 71 moves with its front end facing the charging base 81, such that the charging sensor set zone 76 is located at the front end of the top side of the mobile robotic vacuum cleaner 71.

The central sensor 11, the left sensor 13, and the right sensor 15 are electrically connected with the main processor 72 and mounted to the charging sensor set zone 76. What these sensors 11, 13 & 15 detect are the optical signals emitted by the optical emitter 82. In this embodiment, these sensors 11, 13 & 15 are infrared sensors. Alternatively, these sensors 11, 13 & 15 can be ultraviolet sensors or of other invisible light. Besides, a protective cover 18 is mounted to the charging sensor set zone 76 to shield the sensors 11, 13 & 15, being transparent and highly translucidus. The charging sensor set zone 76 further includes a partition board set 76 which can partition the charging sensor set zone 76 into a central section 191, a left section 193, and a right section 195. The central section 191 has an opening facing forward. The left section 193 is sectorial, extending forward and leftward at the right angle. The right section 195 is also sectorial, extending forward and rightward at the right angle. The central sensor 11 is located at the central section 191. The right sensor 13 is located at the left section 193. The right sensor 15 is located at the right section 195.

A judgment logic 17 is saved in a memory device 70, which is mounted to the mobile robotic vacuum cleaner 71 and electrically connected with the main processor 72. The memory device 70 belongs to the prior art and it is not the key point of the present invention, so its detailed recitation is skipped.

In light of the above, the main processor 72 can judge whether the mobile robotic vacuum cleaner 71 correctly moves toward the charging base 81 via the judgment logic 17 according to the signals detected by the sensors 11, 13 & 15 to guide the mobile robotic vacuum cleaner 71 to correctly move to the charging base 81.

When the power of the mobile robotic vacuum cleaner 71 is lower than a default value, a charging searching mode is activated, and meanwhile, the mobile robotic vacuum cleaner 71 starts to search the charging base 81. Once one of the sensors 11, 13 & 15 detects the infrared signals emitted by the charging base 81, the mobile robotic vacuum cleaner 71 can judge that the charging base 81 is found; meanwhile, the judgment logic 17 can judge whether the mobile robotic vacuum cleaner 71 correctly moves to the charging base 81.

The main processor can function via the judgment logic 17 according to the following rules. If only the central sensor 11 or all of the sensors 11, 13 & 15 detect the optical signal, it will be judged that the mobile robotic vacuum cleaner 71 correctly moves toward the charging base 81 and meanwhile, the main processor 72 will not apply any turning control to the driving system 74. If only the right sensor 15 or both of the central and right sensors 11 & 15 detect the optical signal, it will be judged that the mobile robotic vacuum cleaner 71 is moving leftward forward and then the main processor 72 will control the driving system 74 for rightward turning. If only the left sensor 13 or the left and central sensors 13 & 15 detect the optical signal, it will be judged that the mobile robotic vacuum cleaner 71 is moving rightward forward and then the main processor 72 will control the driving system 74 for rightward turning.

Figure 5:
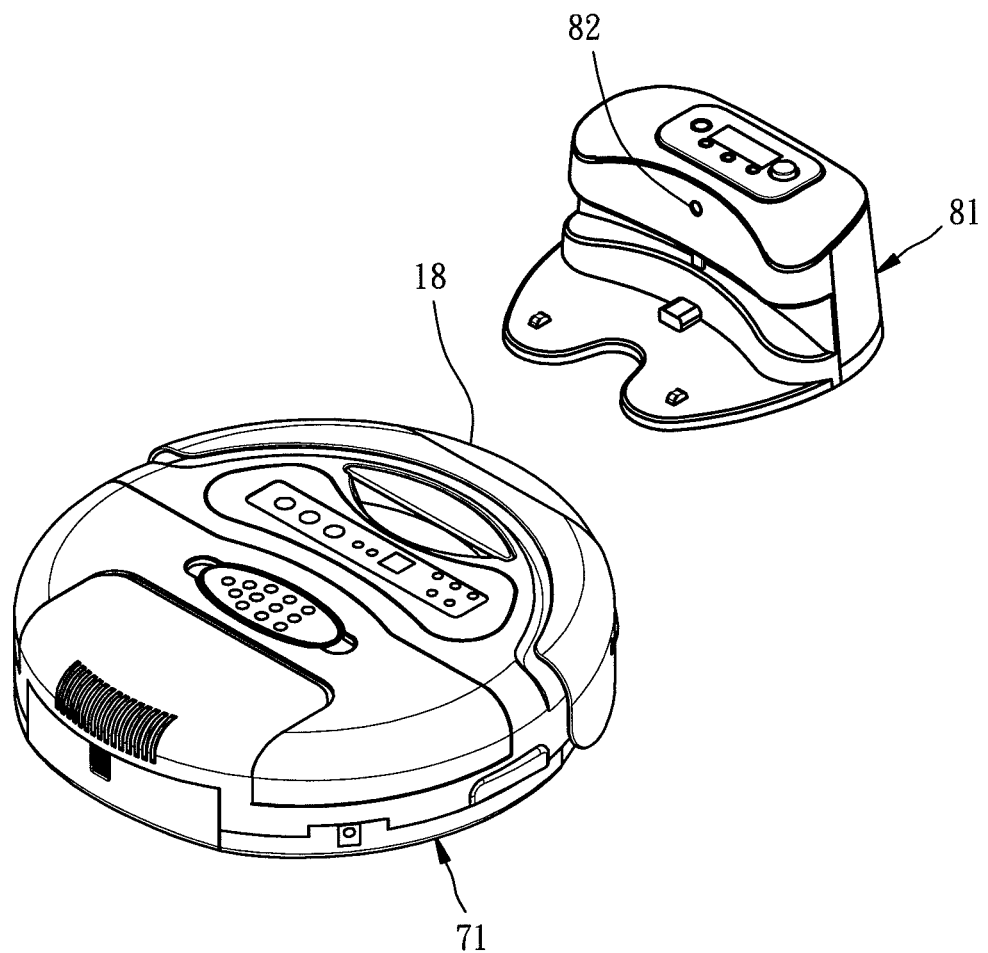
FIG. 5 is a perspective view of the preferred embodiment of the present invention at work.

The main processor 72 can controllably allow the mobile robotic vacuum cleaner 71 to adjust its moving direction and move forward through the judgment logic 17 and the driving system 74 to further guide the mobile robotic vacuum cleaner 71 to move toward the charging base 81, as shown in FIG. 5.

The protective cover 18 can protect the sensors 11, 13 & 15 from damage resulting from impinge. The protective cover 18 is transparent in such a way that the optical signals can run through it to allow the sensors 11, 13 & 15 to detect the optical signals.

In addition, the central, left, and right sections 191, 193 & 195 can confine the direction of the optical signals that the sensors 11, 13 & 15 can detect to enable preferably correct directiveness of alignment of the mobile robotic vacuum cleaner 71 with the charging base 81, further ensuring the accuracy and reliability of the charging operation.

In conclusion, the present invention can allow the mobile robotic vacuum cleaner 71 to correctly move to the charging base 81 and to be accurately positioned in the charging base 81 for correct and reliable charging operation.

Although the present invention has been described with respect to a specific preferred embodiment thereof, it is in no way limited to the specifics of the illustrated structures but changes and modifications may be made within the scope of the appended claims.

What is claimed is:

1. A guiding device for guiding a mobile robotic vacuum cleaner to a charging base, the mobile robotic vacuum cleaner having a main processor and a driving system, the charging base having an optical emitter for emitting at least one optical signal toward a predetermined direction, the guiding device comprising:
   a central sensor,
   a left sensor, and
   a right sensor,
   the mobile robotic vacuum cleaner having a charging sensor set zone that faces the charging base while the mobile robotic vacuum cleaner moves to the charging base, the central, left, and right sensors being electrically connected with the main processor and mounted to the charging sensor set zone for detecting the at least one optical signal emitted by the optical emitter, the charging sensor set zone being located entirely at a front end of the mobile robotic vacuum cleaner,
   whereby the main processor can judge whether the mobile robotic vacuum cleaner correctly moves toward the charging base according to the at least one optical signal detected by the sensors and then controllably allow the mobile robotic vacuum cleaner to adjust its moving direction and move forward via the driving system in such a way that the mobile robotic vacuum cleaner can be guided to correctly move toward the charging base.

2. The guiding device as defined in claim 1, wherein the charging sensor set zone is located at a top side of the front end of the mobile robotic vacuum cleaner.

3. The guiding device as defined in claim 1 further comprising a protective cover, wherein the protective cover is mounted to the charging sensor set zone and covers the sensors.

4. The guiding device as defined in claim 3, wherein the protective cover is translucidus.

5. The guiding device as defined in claim 1 further comprising a partition board set, wherein the partition board set is mounted to the charging sensor set zone for partitioning off the charging sensor set zone into a central section, a left section, and a right section; the central sensor is located at the central section, the left sensor is located at the left section, and the right sensor is located at the right section.

6. The guiding device as defined in claim 5, wherein the central section comprises an opening facing forward; the left section is sectorial and extends forward and leftward at the right angle; the right section is sectorial and extends forward and rightward at the right angle.

7. The guiding device as defined in claim 1 further comprising a judgment logic, wherein the judgment logic is saved in a memory device mounted to the mobile robotic vacuum cleaner and electrically connected with the main processor, whereby the main processor can judge whether the mobile robotic vacuum cleaner correctly moves toward the charging base via the judgment logic according to the signal detected by the sensors.

8. The guiding device as defined in claim 7, wherein the judgment logic works according to the following rules:
   if only the central sensor or all of the sensors detect the optical signal, it will be judged that the mobile robotic vacuum cleaner correctly moves toward the charging base;
   if only the right sensor or the central and right sensors detect the optical signal, it will be judged that the mobile robotic vacuum cleaner is moving leftward forward; and
   if only the left sensor or the left and central sensors detect the optical signal, it will be judged that the mobile robotic vacuum cleaner is moving rightward forward.

* * * * *